(12) United States Patent
Friedlander et al.

(10) Patent No.: US 6,501,747 B1
(45) Date of Patent: Dec. 31, 2002

(54) MANIFOLD ASSISTED CHANNEL ESTIMATION AND DEMODULATION FOR CDMA SYSTEMS IN FAST FADING ENVIRONMENTS

(75) Inventors: Benjamin Friedlander, Palo Alto, CA (US); Shimon B. Scherzer, Sunnyvale, CA (US); William L. Abbott, Portola Valley, CA (US)

(73) Assignee: Metawave Communications Corporation, Redwood, WA (US)

( * ) Notice: Subject to any disclaimer, the term of this patent is extended or adjusted under 35 U.S.C. 154(b) by 0 days.

(21) Appl. No.: 09/310,567

(22) Filed: May 12, 1999

Related U.S. Application Data

(60) Provisional application No. 60/111,437, filed on Dec. 8, 1998, provisional application No. 60/097,544, filed on Aug. 21, 1998, and provisional application No. 60/097,340, filed on Aug. 20, 1998.

(51) Int. Cl.[7] .............................................. H04B 7/216
(52) U.S. Cl. ........................ 370/342; 370/442; 375/148; 375/150
(58) Field of Search ................................. 370/320, 334, 370/335, 339, 342, 441, 479, 442; 375/142, 144, 148, 150, 140, 145, 146, 147, 130, 152

(56) References Cited

U.S. PATENT DOCUMENTS

| | | | | |
|---|---|---|---|---|
| 6,137,788 A | * | 10/2000 | Sawahashi et al. | 370/342 |
| 6,229,843 B1 | * | 5/2001 | Lomp et al. | 375/150 |
| 6,301,293 B1 | * | 10/2001 | Huang et al. | 375/206 |
| 6,333,934 B1 | * | 12/2001 | Miura | 370/441 |
| 6,363,104 B1 | * | 3/2002 | Bottomley | 375/148 |

* cited by examiner

*Primary Examiner*—Vivian Chin
*Assistant Examiner*—John J Lee
(74) *Attorney, Agent, or Firm*—Fulbright & Jaworski L.L.P.

(57) ABSTRACT

Known antenna array manifold information is exploited to provide for fast and accurate channel estimation and demodulation on both the forward and reverse links, thereby increasing capacity in PCS and cellular CDMA networks that use adaptive antenna arrays. On the reverse link, an "extended" array manifold is used to assist the demodulator in maintaining a dynamic estimate of the spatial signature to use for beamforming and coherent demodulation. On the forward link, channel estimation is performed in the handset to provide a robust solution for beamforming.

48 Claims, 6 Drawing Sheets

MANIFOLD ASSISTED CHANNEL ESTIMATION AND DEMODULATION FOR CDMA SYSTEMS IN FAST FADING ENVIRONMENTS

The present invention is related to, and hereby claims priority to, U.S. provisional patent applications Ser. Nos. 60/097,340 entitled "Practical Space-Time Radio Method For CDMA Communication Capacity Enhancement," filed Aug. 20, 1998; 60/097,544 entitled "Integrated Spatial Demodulator For CDMA Systems In Fast Fading Enviornments," filed Aug. 21, 1998; and 60/111,437 entitled "Manifold Assisted Channel Estimation For CDMA Systems In Fast Fading Environment," filed Dec. 8, 1998.

BACKGROUND

1. Field of the Invention

The present invention relates to wireless communication systems, and in particular, to using adaptive antenna arrays in PCS and cellular CDMA networks for capacity enhancement.

2. Description of Related Art

A standard technique used by commercial wireless phone systems for increasing capacity is to divide the service region into spatial cells. Instead of using just one base station to serve all users in the region, a collection of base stations is used to independently service separate spatial cells. In such a cellular system, multiple users can reuse the same frequency channel without interfering with each other, provided the users access the system from different spatial cells. The cellular concept, therefore, is a simple type of spatial division multiple access (SDMA). Note that throughout this description, various acronyms will be used, which are listed and defined in the Table below.

| Acronym | Definition |
| --- | --- |
| AOA | Angle of arrival |
| ARIB | Association of Radio Industries |
| BS | Base station |
| CDMA | Code division multiple access |
| CM | Constant modulus |
| DSP | Digital signal processing |
| EMP | Extended manifold processor |
| FDD | Frequency division duplexing |
| FHT | Fast Hadamard transformers |
| FL | Forward link |
| MAC | Multiply-and-accumulate |
| MAD | Manifold assisted demodulator |
| MMSE | Minimum mean-squared error |
| MS | Mobile station |
| OTD | Orthogonal transmit diversity |
| PN | Pseudo-noise |
| PSC | Primary spatial correlator |
| RL | Reverse link |
| SDMA | Spatial division multiple access |
| SIR | Signal-to-interference ratio |
| SNR | Signal-to-noise ratio |
| SVD | Singular value decomposition |
| TOA | Time of arrival |

In the case of digital communication, additional techniques can be used to increase capacity. One well-known method is to use spatial signal processing in code division multiple access (CDMA) systems. CDMA is normally a spread-spectrum technique that does not limit individual signals to narrow frequency channels but spreads the signals throughout the frequency spectrum of the entire band. Signals sharing the band are distinguished by assigning different orthogonal digital code sequences or spreading signals to each signal. Practical techniques for capacity enhancement in CDMA systems using an antenna array are described in commonly-owned U.S. patent application Ser.No. 08/929,638 entitled "PRACTICAL SPACE-TIME RADIO METHOD FOR CDMA COMMUNICATION CAPACITY ENHANCEMENT" and U.S. Prov. patent application Ser. No. 60/071,473, entitled "FADING MITIGATION USING WIDE APERTURE ANTENNA ARRAY IN SPREAD SPECTRUM COMMUNICATION SYSTEMS" and 60/077,979, entitled "CAPACITY ENHANCEMENT FOR W-CDMA SYSTEMS", all of which are incorporated by reference in their entirety.

Spatial signal processing can be used in both the forward link (base station to mobile station) and reverse link (mobile station to base station) of a CDMA communication system to provide significant signal-to-noise ratio and capacity improvements. In the reverse link, spatial signal processing includes estimating a spatial signature (defined herein as the vector of antenna output signals, including multipath components, at a given time due to a transmitted signal at a certain location, such as described in "Experimental Studies of Spatial Signature Variation at 900 MHz for Smart Antenna Systems" by S. S. Jeng, G. Xu, H. P. Lin, and W. J. Vogel, IEEE Trans. on Antennas and Propagation, vol. 46, no. 7, July 1998, pp. 953–962, which is incorporated by reference in its entirety) of an IS-95 based CDMA signal to determine multipath angle of arrival (AOA) values and coefficients. An IS-95 system is described in TIA/EIA/IS-95-A, "Mobile Station-Base Station Compatibility Standard for Dual-Mode Wideband Spread Spectrum Cellular Systems", May 1995, which is incorporated by reference in its entirety. The reverse link coefficients are then used to combine a plurality of antenna output signals (after down-conversion to base band), i.e. beamforming. Thus, the ability to accurately estimate the spatial signature is an important objective in CDMA systems. However, with a frequency division duplexing (FDD) system, the forward link and the reverse link occupy different carrier frequencies or bands, but overlap in time. This difference between the forward and reverse link frequencies reduces the correlation between fading of the two links so that the two links have significantly different spatial signatures. Therefore, forward link beamforming using the reverse link spatial signature estimate is not possible. However, average AOA is generally preserved in FDD systems between the forward and reverse links for mobile stations far away from the base station.

Factors which limit the ability to provide for accurate spatial signature estimation include the fading rate (Doppler spread), angle spread, and delay spread profiles of the incoming signals. In particular, fast fading, which is created by the combination of multipath components of a signal being reflected from various elements ("scatterers") in the neighborhood ("scattering zone") of a moving transmitter with random phases, is a major concern in accurate spatial signature estimation. The wireless communication channel is assumed to have multiple scattering zones characterizing the signal propagation between the base station (BS) and the mobile station (MS). "Mobile Cellular Telecommunications" by W. C. Lee, McGraw-Hill, New York, 1995, which is incorporated by reference in its entirety, describes scattering zones around the mobile station. The main scattering zone is in the neighborhood of the MS. Large objects, such as buildings and waterways, create other scattering zones. Metal objects in the vicinity of the BS can cause the signal to be reflected and can influence the transmission path. However, in most cases, the BS antenna array is located above the nearby scatterers, which are assumed to be less significant. As the fading rate or Doppler spread increases, the time available to collect coherent data (integration time) decreases. This problem becomes more severe as cellular systems move from the 800 MHz range to the 1900 MHz range or higher, which can increase the fading or Doppler spread by a factor of two or more. For example, a vehicle moving at 60 mph can induce a Doppler spread in excess of 180 Hz in a 1900 MHz system. In general, spatial signature estimation must take place in a duration that is an order of magnitude shorter than the period of the fading rate. For example, if the fading rate is 100 Hz, then spatial signature estimation must take place within 1 msec.

Various methods for spatial signature estimation or beamformer generation have been proposed. These methods can be characterized by the level of knowledge of the structure of the signal impinging on the antenna array and whether or not a training sequence is present. Characteristics of the temporal, spatial, spectral, or modulation structure of the impinging signal may be known and can be exploited in the spatial signature estimation, such as described in "Algebraic Methods for Deterministic Blind Beamforming" by A. J. Van der Veen, Proceedings of IEEE, vol. 86, no. 10, October, 1998, pp. 1987–2008, which is incorporated by reference in its entirety. Many adaptive algorithms based on minimum mean-squared error (MMSE) or constant modulus (CM) and exploiting temporal or modulation signal structure to perform estimation of the spatial signature are well known, such as described in "Algebraic Methods for Deterministic Blind Beamforming" by A. J. Van der Veen, referenced above, and in "Space-Time Processing for Wireless Communications" by A. J. Paulraj and C. B. Papadias, IEEE Signal Processing Magazine, vol. 14, no. 6, November 1997, pp. 49–83 and "Adaptive Filter Theory" by S. Haykin, Prentice-Hall, Englewood Cliffs, N.J., 1986, both of which are incorporated by reference in their entirety.

A disadvantage of these adaptive algorithms is that they generally do not exploit knowledge of the array spatial information or array manifold and generally require substantial time to converge.

The array manifold is a collection of array response vectors (where each array response vector is the set of antenna output signals at a given point in time due to a far-field signal with no multipath) created by stepping the angle of a narrow-band point source (in two or three-dimensional space, under far-field and no multipath conditions). The array manifold is a trace in M-dimensional space, where M is the number of antenna elements in the array. Array manifolds are well known and are described in references such as in "Algebraic Methods for Deterministic Blind Beamforming" by A. J. Van der Veen, referenced above.

A signal arriving at the antenna array in a non-multipath situation produces a received vector that is on the array manifold. However, when multipath exists, the received vector is a linear combination of all arriving multipath wave fronts, which is no longer on the array manifold. The Euclidean distance between the array manifold and the received vector is a function of multipath level, multipath angle spread, and interference power and increases with an increase in each of these variables. Interference includes the sum of thermal noise and other incoming transmissions.

Another disadvantage of some MMSE adaptive algorithms based on nullifying specific interferers is that performance is reduced when the number of interference sources is large (typical for CDMA). Furthermore, using a dedicated pilot signal (e.g., for training) on the reverse link requires the pilot signal to be low power in order to minimize capacity loss in the reverse link. However, a lower power pilot in coherent demodulation requires a longer integration time to assure sufficient reference signal quality.

Also, an unknown or varying signal time of arrival (TOA) requires continuous "time searching" and determination of beamformer coefficients at each time hypothesis. In CDMA type systems, the signal timing must be recovered before any demodulation can take place. Hence, a search process is conducted by a series of hypotheses through which the system is varying the time of the reference correlating sequence and then cross-correlating with the incoming signal (e.g., IS-95). The time required by each hypothesis must be short to allow a quick search (assuming that recovery of signal timing cannot be done before determination of beamformer coefficients since there might not be sufficient signal-to-noise ratio at that point). Thus, any adaptive algorithm to determine the beamformer coefficients must provide fast convergence in order to achieve a reasonable overall search time.

Furthermore, MMSE algorithms operating in "decision-directed" mode, as discussed in "Adaptive Filter Theory" by S. Haykin, referenced above, tend to fail at low signal-to-interference ratio (SIR) conditions at the system input. In the presence of fast fading, instances of low SIR are common, which can cause extreme interference or even a "dropped" call.

Therefore, a system and method are desired that provide channel estimation in both forward and reverse links and in fast fading and low SIR environments.

SUMMARY

In accordance with the invention, known antenna array manifold information is exploited to provide for fast and accurate channel estimation and demodulation in both the forward and reverse links, thereby increasing capacity in PCS and cellular CDMA networks that use adaptive antenna arrays. On the reverse link, an "extended" array manifold is used to assist the demodulator in maintaining a dynamic estimate of the spatial signature to use for beamforming and coherent demodulation. On the forward link, channel estimation is performed in the handset to provide a robust solution for beamforming.

A de-spread received signal vector $y_i$ (i=1 to N) from M antenna element output terminals corresponding to 1 of N possible received symbols is spatially correlated with the array manifold matrix C to produce a correlation vector p. The array manifold matrix C is an M×K matrix, where M is the number of antenna elements, and K is the number of angles used to create the array manifold (e.g., K=256), i.e., each row of matrix C represents one antenna element of the array manifold, and each column of matrix C represents one angle in the array manifold. This matrix generally spans the whole M-dimensional space produced by the M-element antenna array.

The resulting correlation vector p represents a correlation between the de-spread, received vector corresponding to one of the N possible symbols with each of the K angles of the array. The spatial correlation is performed for each of the N possible received symbols to produce a K×N matrix P, where the $i^{th}$ column of the p matrix contains values with magnitudes corresponding to the level of correlation between $y_i$ and the array manifold for all K angles. Finding the maximum element of the $i^{th}$ column of P is equivalent to selecting the column of the array manifold that is closest in Euclidean distance to the vector $y_i$.

The P matrix is then used to produce a magnitude and angle of arrival (AOA) estimate each symbol time, which are accumulated to generate an AOA histogram. After low-pass filtering (or "smoothing"), this histogram will exhibit "peaks" in the direction of the main scatterers and a distribution that follows the angular spread of the transmission source. The multipath scattering area size (or angle spread) can be estimated from the variance of the distribution around a peak. Thus, the histogram can be used to determine the AOA and angular distribution of the most probable signal paths.

Next, if the incoming signal angular distribution is known, a subspace V spanned by the columns of the array manifold matrix C associated with the given angular distribution (mean and variance of the signal AOA) can be defined. These columns (vectors) span a subspace that can be approximated by finding a set of L orthogonal vectors that contains most of the signal energy. Finding this reduced rank subspace $\hat{V}$ can be done by singular value decomposition (or a similar procedure) of the original subspace and selecting the singular vectors corresponding to the larger singular values.

Since the de-spread, received antenna vector $y_i$ contains contributions from all directions, it contains energy in the full space spanned by the columns of the antenna array manifold C. Most interference can be filtered out of the received vector by projecting this vector $y_i$ into the confined subspace $\hat{V}$. Thus, the sampled received antenna vector (after de-spreading) is projected into this approximated subspace, $\hat{V}$, by a simple dot product of the received vector with each of the columns of matrix $\hat{V}$. The projection coefficient vectors corresponding to preliminary data symbol decisions are averaged over a predetermined number of symbols. The number of vectors to average is determined by the Doppler spread and is selected to correspond to a time period during which the spatial signature is relatively stable. Generally, this period is an order of magnitude shorter than the period of the Doppler spread. The averaged projection coefficient vector, $Z_{avg}$, is then multiplied by the approximated subspace vectors from matrix $\hat{V}$ to form the beamformer coefficient vector w. If more than one distinguishable AOA exists, several beamformers are used to track the multiple scattering zones.

The processed vector w contains less interference and noise than the original vector y because the subspace projection rejects all the components that are orthogonal to the selected subspace. Projecting the received vectors into a subspace of dimension L reduces the noise power by a factor of M/L, where M is the number of antenna elements. If the subspace is selected correctly, then the signal power is only slightly reduced. Thus, signal-to-noise ratio (SNR) for the beamformer coefficient vector is improved by approximately M/L. This reduces the amount of data that needs to be integrated for the purpose of estimating the beamformer coefficients. As a result, performance is improved (e.g., lower symbol error rate for a given SNR) in fast fading environments when compared with direct averaging of de-spread received vectors and compared to conventional two antenna systems with diversity combining.

The extended manifold concept also can be used to provide an initial beamformer coefficient vector for other methods such as MMSE adaptive algorithms. Since the initial coefficient vector is closer to the desired solution and has better SNR, an adaptive algorithm will converge more quickly.

Even partial knowledge of the array manifold can significantly reduce required integration times, provide improved stability, and simplify the computational process. The array manifold allows accurate AOA and multipath angle spread estimation using "smoothed" data, as described in U.S. Pat. App. "PRACTICAL SPACE-TIME RADIO METHOD FOR CDMA COMMUNICATION CAPACITY ENHANCEMENT" and U.S. Prov. Pat. Apps. "FADING MITIGATION USING WIDE APERTURE ANTENNA ARRAY IN SPREAD SPECTRUM COMMUNICATION SYSTEMS" and "CAPACITY ENHANCEMENT FOR W-CDMA SYSTEMS", referenced above. The AOA and angle spread information can provide "bounds" for spatial signature estimation, thereby eliminating large beamformer errors even when the SIR becomes low.

Overall, the present invention offers 1) increased implementation efficiency since the system can be implemented cost-effectively within an ASIC not only for base stations, but also for handsets, 2) high speed operation suitable for both stationary and mobile applications, and 3) stable performance, i.e., not susceptible to convergence and stability issues associated with many adaptive spatial filtering algorithms.

The present invention will be more fully understood upon consideration of the detailed description below, taken together with the accompanying drawings.

BRIEF DESCRIPTION OF THE DRAWINGS

Use of the same reference symbols in different figures indicates similar or identical items.

DETAILED DESCRIPTION OF THE PREFERRED EMBODIMENTS

Figure 1:
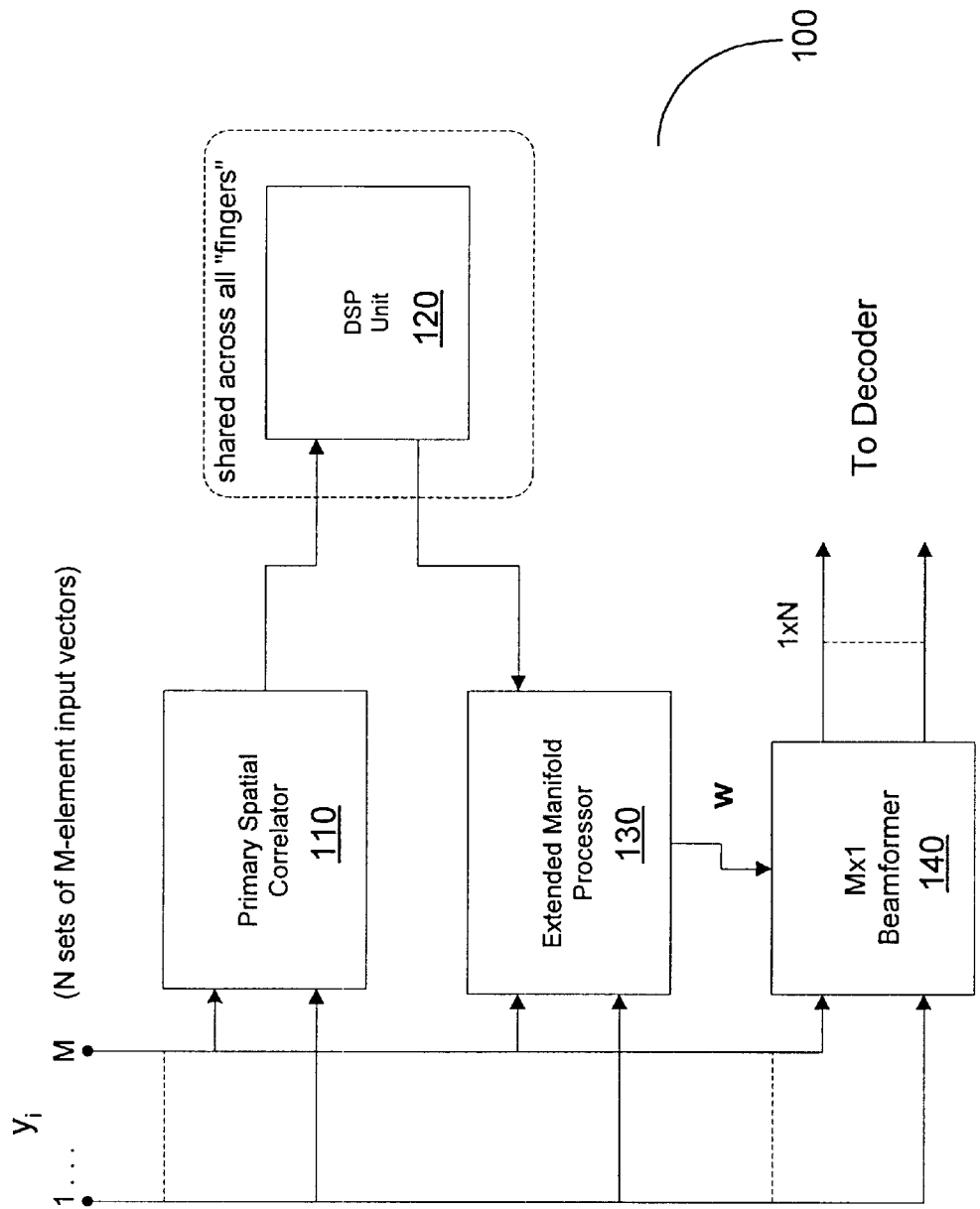
FIG. 1 is a partial block diagram of a beamforming system according to one embodiment of the present invention.

FIG. 1 shows a partial block diagram of a beamforming system in accordance with the present invention. Throughout the description, a beamforming system or demodulator implementation that uses the extended array manifold concept, discussed in detail below, is referred to as a manifold assisted demodulator (MAD). In FIG. 1, a portion of a MAD 100 is shown, which includes a primary spatial correlator (PSC) 110, a digital signal processing (DSP) unit 120, an extended manifold processor (EMP) 130, and a beamformer unit 140. De-spread received signal vectors $y_i$ (i=1 to N, where N is a selected integer representing the number of possible received symbols) are transmitted to PSC 110, EMP 130, and beamformer 140. Each signal vector $y_i$ is a set of M signal components, where M is the number of antenna elements in the antenna. Signal vectors $y_i$ will be discussed in detail below for IS-95 and "3rd Generation" or "3G" systems (e.g., CDMA2000, as described in "The cdma2000 ITU-R RTT Candidate Submission", TIA Subcommittee TR-45.5, June 1998 and W-CDMA, as described in "Japan's Proposal for Candidate Radio Transmission Technology on IMT-2000: W-CDMA", Association of Radio Industries and Businesses (ARIB) IMT-2000 Study Committee, June 1998, both of which are incorporated by reference in their entirety). Thus, each of PSC 110, EMP 130, and beamformer 140 receive N sets of M signals $y_i$ to $y_N$. The N sets correspond to the results of correlation of the de-spread M-element received antenna vector against N possible received symbols. FIG. 1 shows one "finger" of a Rake-type receiver; the single DSP unit 120 is shared across all fingers. Rake-type receivers are known and described in references such as "CDMA, Principles of Spread Spectrum Communication" by A. J. Viterbi, Addison-Wesley, Reading, Mass., 1995, which is incorporated by reference in its entirety. Note that PSC 110, EMP 130, and/or beamformer 140 could also be shared across fingers, although the description is for a dedicated PSC, EMP, and beamformer per finger.

Each PSC 110 performs a spatial correlation between the M×N matrix Y of de-spread received vectors $y_i$ and an array manifold matrix C, as given by equation (1).

$$P=C^H Y \qquad (1)$$

where the superscript H denotes a Hermitian-transpose. The array manifold matrix C is an M×K matrix, where K is the number of angles used to create the array manifold (e.g., K=256), i.e., each row of matrix C represents one antenna element of the array manifold, and each column of matrix C represents one angle in the array manifold. This matrix generally spans the whole M-dimensional space produced by the M-element antenna array. The $i^{th}$ column of the K×N matrix P contains values with magnitudes corresponding to the level of correlation between $y_i$ and the array manifold for all K angles. Finding the maximum element of the $i^{th}$ column of p is equivalent to selecting the column of the array manifold that is closest in Euclidean distance to the vector $y_i$.

Since the correlation process is linear, both relative amplitude and phase of the incoming signal are preserved. Hence, this process can be utilized for both non-coherent demodulation (e.g., IS-95 M-ary) and coherent phase demodulation (e.g., PSK) schemes, both of which are described in "CDMA, Principles of Spread Spectrum Communication" by A. J. Viterbi, referenced above.

The matrix P of the PSC 110 is further processed in the PSC to produce a magnitude and AOA estimate each symbol time as described below for IS-95 and 3G systems. These values are sent to DSP unit 120 for generating an AOA histogram. Since noise and multipath provide a dynamic received vector, a continuous accumulation of AOA samples allows an AOA histogram to build up. After lowpass filtering (or "smoothing"), this histogram will exhibit "peaks" in the direction of the main scatterers and a distribution that follows the angular spread of the transmission source. The multipath scattering area size (or angle spread) can be estimated from the variance of the distribution around a peak. Thus, the histogram can be used to determine the AOA and angular distribution of the most probable signal paths. AOA histogram processing is described in U.S. patent application Ser. No. 08/929,638, entitled "PRACTICAL SPACE-TIME RADIO METHOD FOR CDMA COMMUNICATION CAPACITY ENHANCEMENT", referenced above.

After creating and processing the AOA histogram, DSP unit 120 generates a matrix $\hat{V}$, which is an approximation of the subspace matrix V. Matrix V is obtained from a singular value decomposition (SVD) of a matrix $C_\theta$, as defined in equation (2) below.

$$C_\theta = USV^H \qquad (2)$$

Matrix $C_\theta$ has rows that are the columns of the array manifold matrix C for the angles $\theta \pm \sigma_s$, where $\sigma_s^2$ is the angle spread estimate variance (as determined from the AOA histogram). Matrix U consists of the left singular vectors of matrix $C_\theta$, matrix S is a diagonal matrix whose entries are the non-negative singular values of $C_\theta$, and matrix V consists of the right singular vectors of matrix $C_\theta$. The V subspace is approximated by selecting L columns of matrix V which correspond to the dominant singular values and forming a new matrix $\hat{V}$. Dominant singular values are defined as those having the largest values. For example, L can be selected to include singular values with 90% of the total sum of all the singular values. The value L can range from 1 to all of the columns of V. Note that in the situation where L includes all the columns of matrix V, matrix $\hat{V}$ is equal to matrix V.

Matrix $\hat{V}$ is calculated for each distinguishable AOA and assigned to the appropriate finger. Matrix $\hat{V}$ for a particular finger is transferred from DSP unit 120 to EMP 130. EMP 130 then performs a projection of the sampled received antenna vector $y_i$ (after de-spreading) into the approximated subspace, $\hat{V}$, by a simple dot product of the received vector with each of the $\hat{V}$ columns. The projection coefficient vector $z_i$ is then given by:

$$z_i = \hat{V}^H y_i \qquad (3)$$

where $y_i$ (i=1 to N) is the M×1 de-spread received vector corresponding to 1 of N possible received symbols. During each symbol time, N possible $y_i$ vectors are projected into the subspace $\hat{V}$, and the resulting one of vectors $z_i$ with the maximum energy (defined as $\|z_i\|^2$) is selected by EMP 130 for further processing. EMP 130 then averages the selected L×1 projection coefficient vector $z_{max}$ over a predetermined number of multiple symbols (to create $z_{avg}$) to further reduce the noise. Vector $z_{avg}$ represents the average projection coefficients that when multiplied by the subspace $\hat{V}$ produce an estimate of the spatial signature. Averaging can be performed on both pilot and data signals. In the case of data, the selected vector $z_{max}$ corresponds to a preliminary data symbol decision (other techniques for generating a preliminary data symbol decision to specify which $z_i$ to average could also be used). The number of vectors to average is determined by the Doppler spread and is selected to correspond to a time period during which the spatial signature is relatively stable. Generally, this period is an order of magnitude shorter than the period of the Doppler spread. Finally, EMP 130 constructs a beamforming coefficient vector w by multiplying the averaged projection coefficient vector, $z_{avg}$, by the approximated subspace $\hat{V}$, as shown by equation (4).

$$w = \hat{V} z_{avg} \qquad (4)$$

EMP 130 transmits the beamformer coefficients w to beamformer 140 for processing with the received signal response vectors $y_i$. Beamformer 140 performs an inner product operation $w^H y_i$. The N resulting values give an indication of the likelihood of each of the N possible symbols and are sent to standard decoder blocks as described in "CDMA, Principles of Spread Spectrum Communication" by A. J. Viterbi, referenced above.

Figure 2:
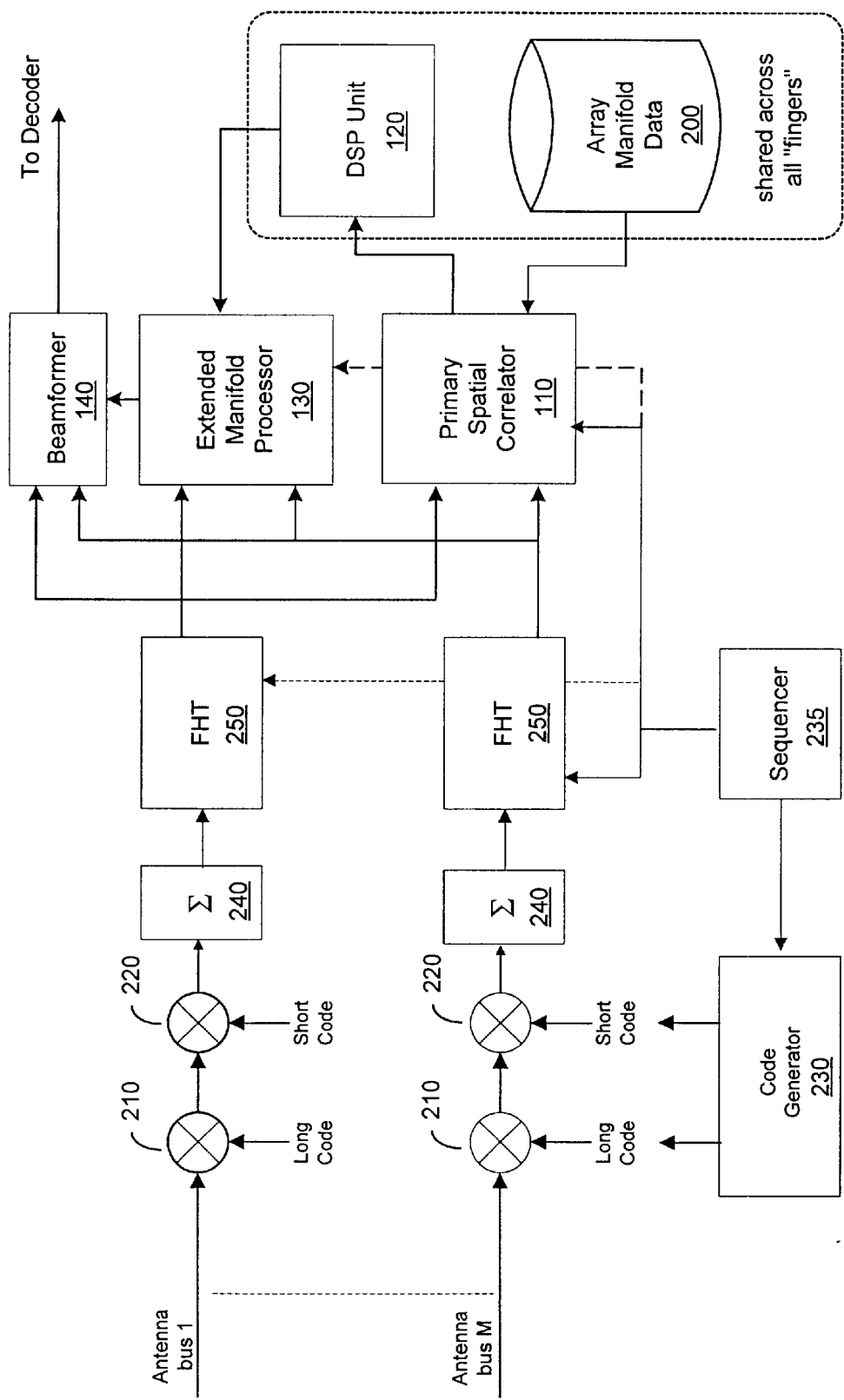
FIG. 2 is a block diagram of a single finger of a manifold assisted demodulator (MAD) for the reverse link of an IS-95 system.

FIG. 2 shows a single finger (demodulation channel) of the MAD discussed above for the reverse link of an IS-95 system. In particular, FIG. 2 provides additional detail as to the processing of the received signal vectors into the MAD. The full MAD implementation includes a plurality of MAD fingers (at least two, to allow for minimum time diversity).

The MAD finger described can perform both time search and demodulation. Note that a local buffer memory 200, which stores the array manifold data, is shared across all fingers, as is DSP unit 120 described above. PSC 110 also can be shared across all fingers in an alternative implementation that would trade fast search time for less complexity.

Referring to FIG. 2, each of M antenna data streams (coming from receiver analog-to-digital converters) is de-spread and accumulated, such as described in "CDMA, Principles of Spread Spectrum Communication" by A. J. Viterbi, referenced above. I and Q components of the received signal are first fed from an antenna array with M elements. The M antenna element output signals are down-converted to a baseband frequency and digitized. The M antenna streams are then de-spread along M parallel correlation channels as each antenna stream is first input to a complex multiplier 210 for multiplication by the appropriate long code and then input to a second complex multiplier 220 for multiplication by an appropriate short code, where the long and short codes are supplied from a code generator 230. A sequencer 235 aligns the timing of the de-spreading operation on Walsh symbol and antenna boundaries (antenna data may be received serially). The de-spreading process is also described in U.S. patent application Ser. No. 08/929,638, referenced above. After de-spreading, each antenna stream is accumulated by an accumulator 240 and input into a bank of Fast Hadamard Transformers (FHTS) 250. Each FHT 250 produces N (e.g., N=64 for IS-95) complex values indicating the level of correlation between the values on that antenna stream and each of the N Walsh symbols. The 64 M-element FHT output response vectors, $y_i$, are collected into an M×64 matrix Y and processed by PSC 110 as in equation (1). Each response vector $y_i$ is cross-correlated with the array manifold data stored in local buffer memory 200. The number of complex multiply-and-accumulate (MAC) operations required per IS-95 Walsh symbol is $$M*N*K=16*64*256=262144, \quad (5)$$

assuming K=256 possible angles and M=16 antenna elements. Since each IS-95 Walsh symbol has duration 208.33 μsec (for a rate of 4800 Hz), PSC 110 must execute $262144*4800=1.26*10^9$ MAC operations per second.

As described in above-referenced U.S. patent application Ser. No. 08/929,638 entitled "PRACTICAL SPACE-TIME RADIO METHOD FOR CDMA COMMUNICATION CAPACITY ENHANCEMENT", if a sufficient number (six or more) of antenna elements is used, the array manifold can be represented with a small number of bits. This reduced number of bits allows a simpler design of the PSC 110 to meet the $1.26*10^9$ MAC operations per second requirement and allows storage of the manifold coefficients in a smaller size memory 200. The result of the PSC correlation operation is the K×N p matrix described above.

The p matrix is further processed to produce a magnitude and angle of arrival (AOA) estimate each symbol time. From an implementation point of view, the most efficient processing on the P matrix is to simply select the overall maximum value. The corresponding row and column index provide the Walsh symbol (not needed when just doing AOA estimation) and AOA estimate, respectively, which are sent (along with the magnitude) to DSP unit 120 for processing. Instead of actually saving the P matrix, the maximum value can be saved from the stream of cross-correlation operations.

In an alternative method of P matrix processing, the quality of the AOA estimate from PSC 110 for use in DSP unit 120 can be improved by averaging some matrix elements before selecting the maximum value. During each symbol time, a new K-element vector $\bar{p}$ is formed, whose elements are the maximum value from each row of matrix P. The vector $\bar{p}$ is then averaged with a number of $\bar{p}$ vectors from previous symbols, where the number of vectors to average is determined by the Doppler spread and is selected to correspond to a time period during which the spatial signature is relatively stable. During each symbol time, the maximum value of the new averaged vector is selected and sent, along with its position (AOA index), to DSP unit 120. Averaging before selecting a maximum value improves the signal-to-noise ratio on the AOA estimate.

DSP unit 120 then creates and processes the AOA histogram and generates a matrix $\hat{V}$, as described above. The matrix $\hat{V}$ is transferred to the EMP 130, which performs the operations described above and feeds the resulting beamformer coefficients to beamformer 140. Using the beamformer coefficient vector w, the beamformer 140 spatially filters the corresponding M-element vector $y_i$ from the M FHT blocks 250. The N resulting values from the beamformer 140 give an indication of the likelihood of each of the N possible symbols. This information is then sent to the standard decoder blocks which are described in "CDMA, Principles of Spread Spectrum Communication" by A. J. Viterbi, referenced above.

Figure 3:
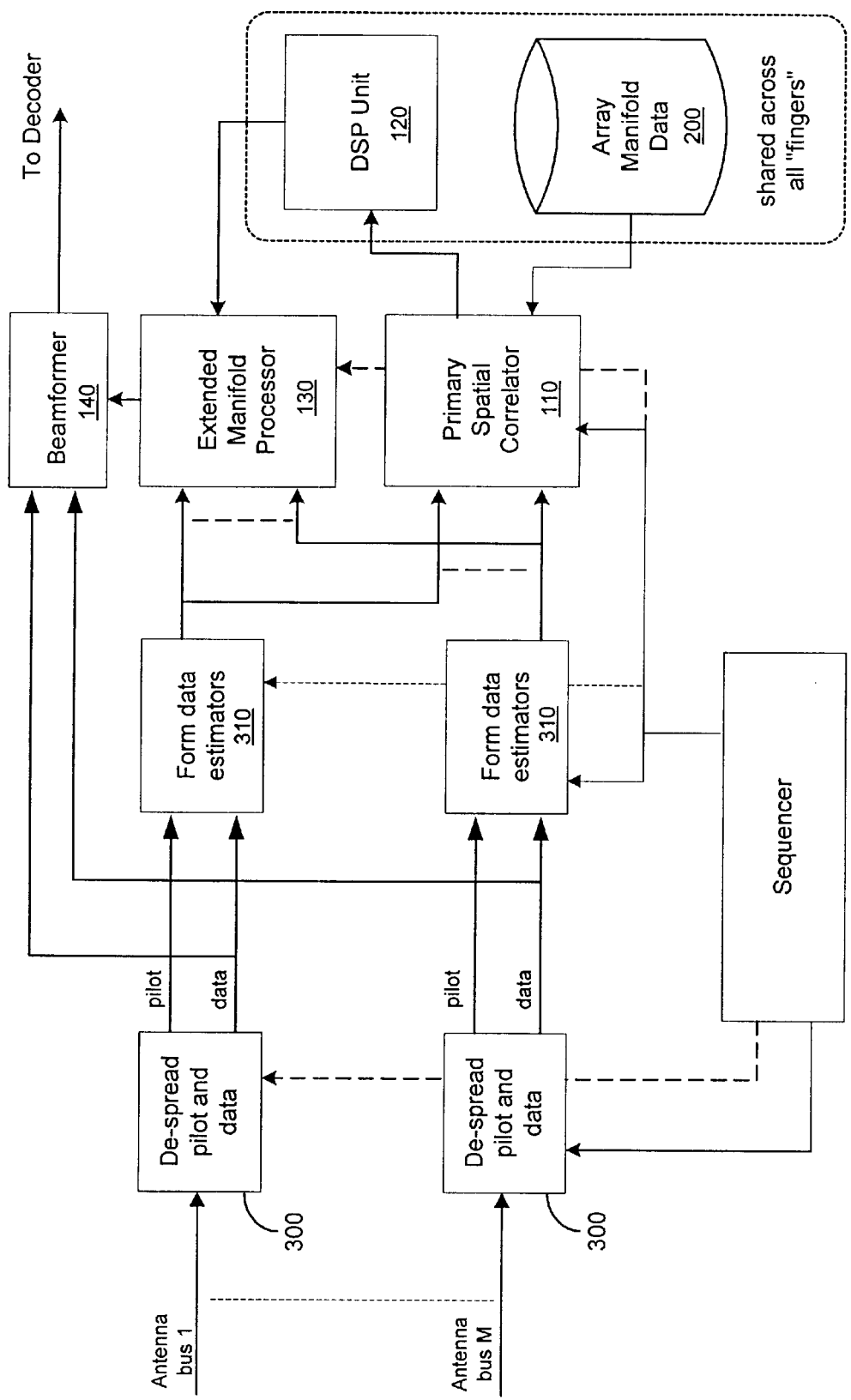
FIG. 3 is a block diagram of a single finger of a MAD for the reverse link of 3G proposed standards.

FIG. 3 shows a single finger of the coherent MAD suitable for 3G proposals (i.e., CDMA2000 and W-CDMA). A significant difference in the 3G proposals relative to the current IS-95 standard is the existence of a pilot signal embedded in the transmitted signal in the reverse link. Details of the reverse link structure for each proposal are given in "The cdma2000 ITU-R RTT Candidate Submission" and "Japan's Proposal for Candidate Radio Transmission Technology on IMT-2000: W-CDMA", respectively, incorporated by reference above.

Similar to IS-95, each of M output signals from an antenna array are de-spread and accumulated in de-spreading blocks 300. However, unlike IS-95, each antenna stream is de-spread into two signals because the 3G systems incorporate an additional pilot signal along with the data signal. Even within the two 3G systems, de-spreading blocks 300 have slightly different structures due to the slight differences between the W-CDMA and CDMA2000 proposals.

Figure 4:
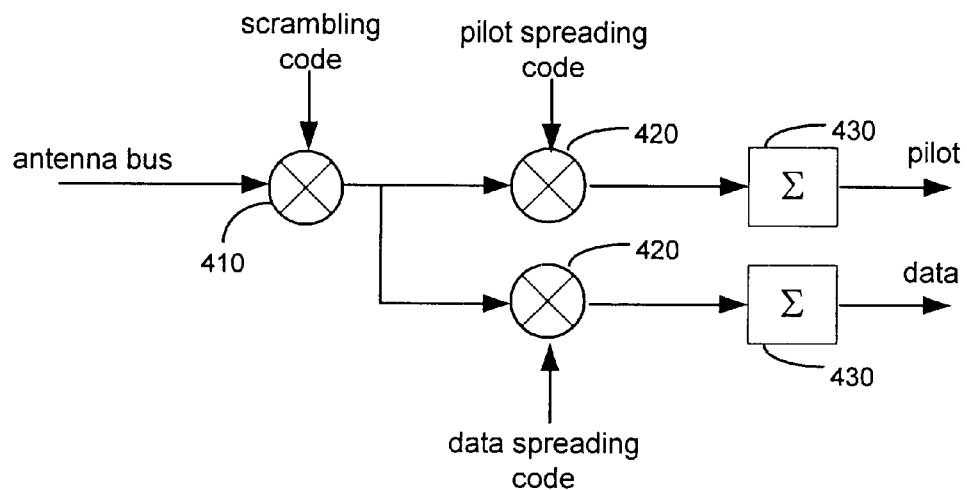
FIG. 4 is a diagram of one of the de-spreading blocks of FIG. 3 for a W-CDMA system.

FIG. 4 shows one of the M de-spreading blocks 300 for W-CDMA. The combined baseband signal is first de-scrambled by sending the signal to a complex multiplier 410 for multiplication with an appropriate scrambling code. The de-scrambled signal is then sent to a set of second complex multipliers 420 for multiplication with a pilot spreading code to de-spread the pilot signal and with a data spreading code to de-spread the data signal, respectively, which separates the signal into respective pilot and data signals. The pilot and data signals are then transmitted to a set of accumulators 430, which accumulates the respective pilot and data signals over the number of pseudo-noise (PN) chips corresponding to one data symbol. Note that the pilot signal is rotated by 90° with respect to the data signal since the pilot is transmitted on the quadrature channel.

Figure 5:
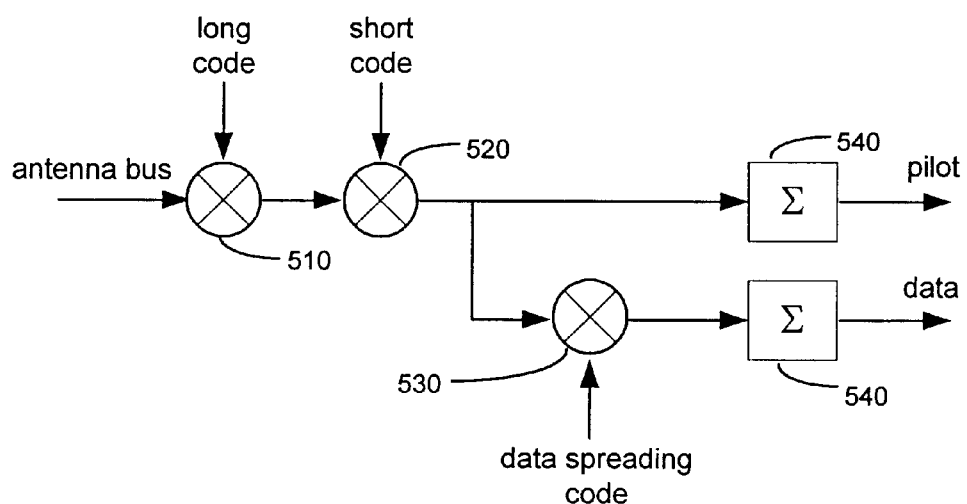
FIG. 5 is a diagram of one of the de-spreading blocks of FIG. 3 for a CDMA2000 system.

FIG. 5 shows one of the M de-spreading blocks 300 for CDMA2000. The combined baseband signal is first input to a complex multiplier 510 for de-spreading with an appropriate long code. The resulting signal is then transmitted to a second complex multiplier 520 for multiplication with an appropriate short code. The signal from second multiplier 520 is sent to a third complex multiplier 530, which multiplies the signal with the appropriate PN code to de-spread the signal and separate out the data signal. Note that the pilot signal is spread with the all ones sequence. The pilot and data streams are sent to a pair of accumulators 540 for accumulation over the number of PN chips corresponding to one data symbol, resulting in received signal values corresponding to the pilot and data symbols. Note that in CDMA2000, the data signal is rotated by 90° with respect to the pilot signal since the data is transmitted on the quadrature channel.

Referring back to FIG. 3, the M-element de-spread and accumulated received vectors $y_p$ and $y_d$, corresponding to the pilot and data signals, respectively, are transmitted to data estimator blocks 310 for the next step in the channel estimation process. The M data estimator blocks 310 use the $y_p$ and $y_d$ vectors to produce the two columns of the M×2 matrix Y. For W-CDMA, the Y matrix is given by $$Y=[y_d+jy_p, -y_d+jy_p], \qquad (6)$$

where $j=\sqrt{-1}$. For CDMA2000, the Y matrix is given by $$Y=[y_p+jy_d, y_p-jy_d]. \qquad (7)$$

After forming the Y matrix, data estimator blocks 310 send the Y matrix to PSC 110 for spatial correlation with the array manifold matrix C, as described above with respect to equation (1).

The number of complex multiply-and-accumulate (MAC) operations required in PSC 110 per data symbol (only two possible data symbols in this case) is $$M*2*K=16*2*256=8192, \qquad (8)$$

assuming, as previously, K=256 possible angles and M=16 antenna elements. For either W-CDMA or CDMA2000, the minimum data symbol duration is approximately 0.5 microseconds. Thus, the PSC must execute up to $8192*2*10^6 = 1.64*10^{10}$ MAC operations per second. As described in the implementation for IS-95, if a sufficient number of antenna elements are used (e.g., M=6 or more), a low number of bits can be used to represent the array manifold, which allows a smaller and simpler PSC 110 to meet the $1.64*10^{10}$ MAC operations per second requirement and allows storage of the manifold coefficients in a smaller size memory 200. The result of the correlation operation in PSC 110 is the P matrix having two columns and K rows. This K×2 p matrix can now be processed as described above with respect to IS-95 (i.e., by selecting the overall maximum value or by averaging some matrix elements before selecting the maximum value) to produce results for DSP unit 120.

Because the P matrix for 3G systems has only two columns, the complete P matrix can be stored more reasonably than the larger P matrices for IS-95. Thus, the P matrix for 3G systems can also be processed by averaging all, instead of just some, of the P matrix elements before selecting the maximum value. During each symbol time, the P matrix is averaged with a number of P matrices from previous symbols, where the number of matrices to average is determined by the Doppler spread and is selected to correspond to a time period during which the spatial signature is relatively stable. During each symbol time, the maximum value of the new averaged matrix is selected and sent, along with its position (AOA index), to DSP unit 120.

As with IS-95 systems, DSP unit 120 then creates and processes the AOA histogram and generates a matrix $\hat{V}$, as described above. The matrix $\hat{V}$ is transferred to the EMP 130, which performs the operations described above and feeds the resulting beamformer coefficients to beamformer 140. Using the beamformer coefficient vector w, the beamformer 140 spatially filters the M-element data vector $y_d$ from the de-spreading blocks 300.

Both the W-CDMA and CDMA2000 proposals recommend coherent demodulation. The beamformer coefficient vector w from EMP 130 is used directly to demodulate the de-spread data vector $y_d$, i.e., the operation of the beamformer 140 is equivalent to coherent demodulation. The complex valued scalar quantity resulting from the demodulation operation, $w^H y_d$, is then sent to standard decoding blocks corresponding to the encoding and modulation blocks described in the W-CDMA and CDMA2000 proposals.

Forward link (FL) (i.e., base station to mobile station) channel estimation and demodulation are performed in a similar way as the reverse link (RL) using the extended array manifold method described above. The following description illustrates a method and implementation for the CDMA2000 proposal. Performing channel estimation in the mobile station (MS) provides several benefits relative to performing channel estimation only in the base station (BS) on the reverse link and using this information for beamforming on the forward link. Some benefits include providing beamforming information when FL and RL usage is highly asymmetrical (i.e., when there are only infrequent RL transmissions), and providing more accurate beamforming information when angle spread is large, which can make it more difficult to determine the FL mean AOA from RL channel estimation.

In the present invention, signals transmitted from each of the M antenna elements in the BS include a different auxiliary pilot spread with an extended Walsh code. This method is compatible with the CDMA2000 proposal. Use of dedicated pilots per MS is avoided since this is less efficient and leads to lower overall performance. The present invention also allows the use of orthogonal transmit diversity (OTD), as described in the proposed CDMA2000 standard. Coded data bits in the BS are split into J data streams that are transmitted through corresponding J beams. Coefficients for the beams are determined using information from the MS as described below.

Figure 6:
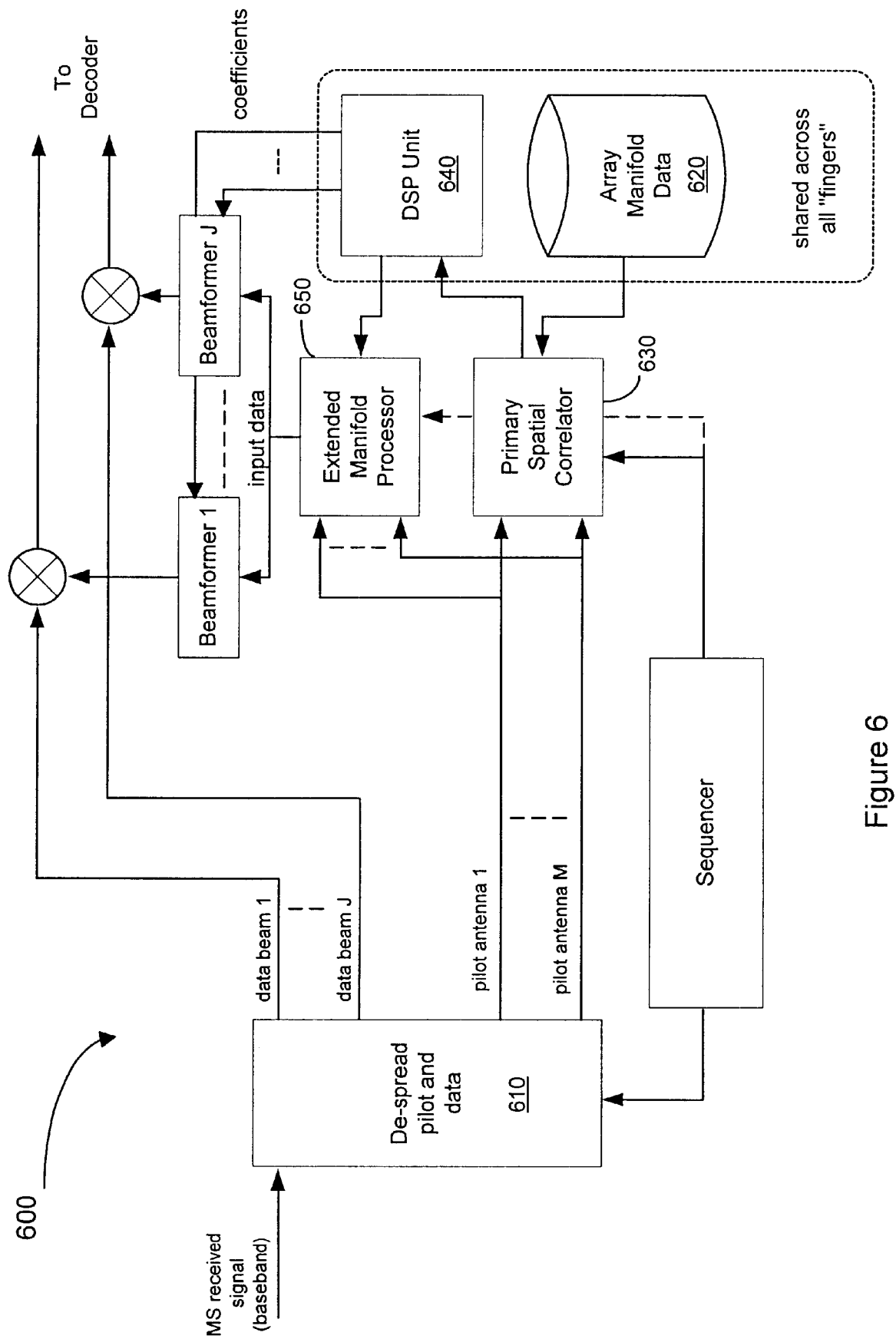
FIG. 6 is a block diagram of a single finger of a MAD for the forward link of a CDMA2000 system.

FIG. 6 shows a single finger (demodulation channel) of a manifold assisted demodulator (MAD) 600 in the MS for the forward link of a CDMA2000 system. MAD 600 is used for both channel estimation and demodulation. Note that in contrast with the MAD finger for the reverse link, the EMP is used to filter the input data to the beamformers and not to filter the coefficients themselves. The received signal from the BS, which has been converted to baseband, is input to a de-spreading block 610 of the MS for separation of the pilot and data signals.

Figure 7:
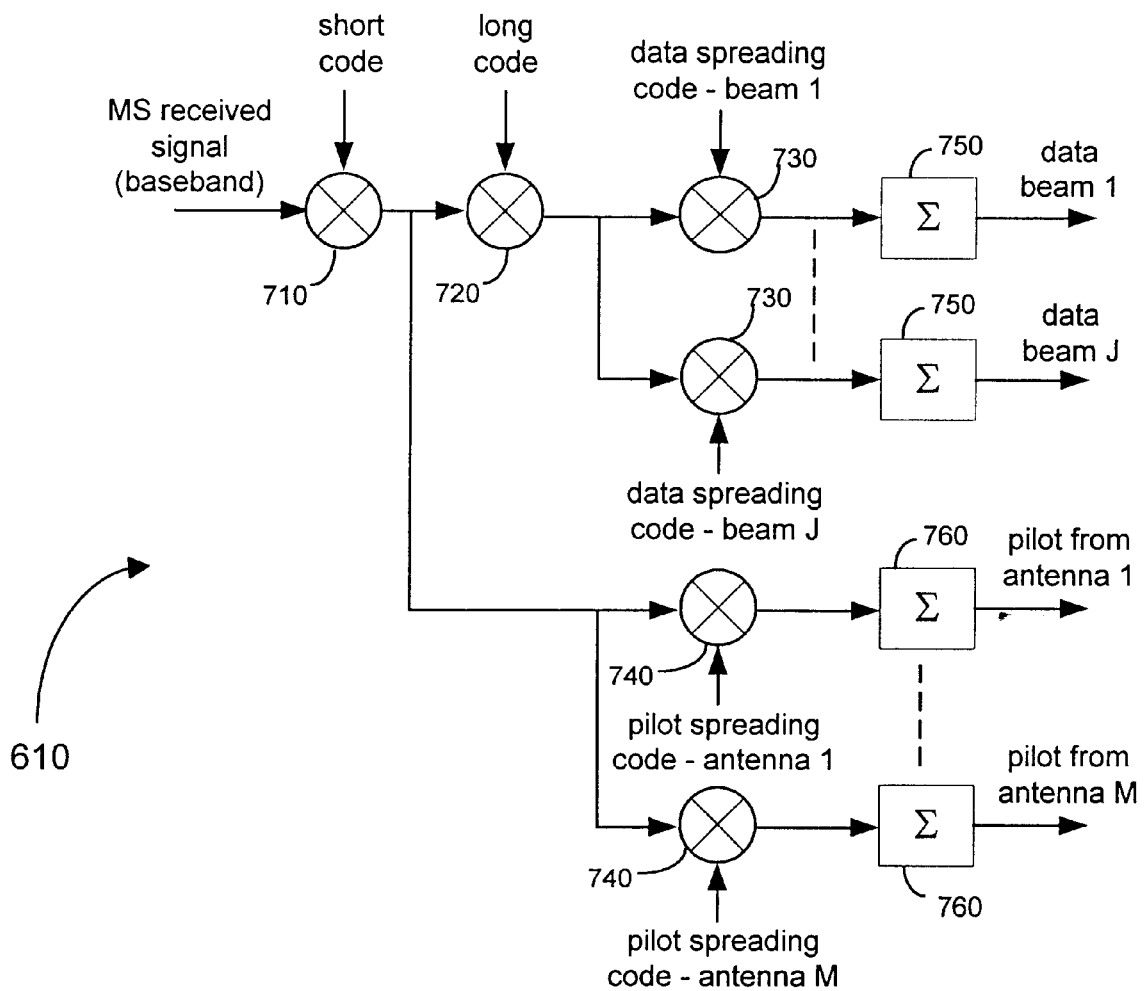
FIG. 7 is a diagram of one embodiment of the de-spreading block of FIG. 6.

FIG. 7 shows one embodiment of de-spreading block 610. The received combined signal is first transmitted to a complex multiplier 710 for de-spreading by complex multiplication with the "PN spreading" or "short" code. The resulting signal is sent to a second complex multiplier 720 for multiplication with the user "long" code, which de-scrambles the data signal. The output signal of second multiplier 720 is transmitted to a set of J complex multipliers 730 for de-spreading the data signal, and the output signal of multiplier 710 is transmitted to a set of M complex multipliers 740 for de-spreading the pilot signal.

The data signals are de-spread into J data streams by complex multiplication with the appropriate Walsh code. Thus, where OTD is being used, J different data streams are obtained. The effective number of spreading codes per user is the same as without OTD as a result of the splitting of the data streams and the extended Walsh code construction described in the proposed CDMA2000 standard. Each of the J de-spread data streams are then transmitted to a corresponding one of J accumulators 750 for accumulation over the number of PN chips corresponding to one data symbol.

The orthogonal pilot signals are de-spread into signals corresponding to each of the M antenna elements by complex multiplication with corresponding extended Walsh codes. Each of the M de-spread pilot signals are transmitted to a corresponding one of M accumulators 760 for accumulation over a number of PN chips corresponding to a time period during which the spatial signature is relatively stable. In general, this time period is determined by the Doppler spread. The resulting M-element vector of pilot signal values is denoted as $y_{fp}$.

First, channel estimation techniques requiring only "slow" (i.e., <1 kbps) overhead messages between the BS and MS and vice versa are described. Identical beamformer coefficients are used in the BS and the MS, with switching of coefficients synchronized to signal frame boundaries.

As part of the access procedure, the MS receives, from the BS, the array manifold table (with each coefficient represented with a small number of bits as described previously) for that BS. The array manifold data is stored in a local buffer memory 620 and is used by a primary spatial correlator (PSC) unit 630 to perform the PSC operation expressed in equation (5), which is similar to equation (1), with Y and P matrices replaced with $y_{fp}$ and $p_f$ vectors.

$$p_f = C^H y_{fp} \qquad (9)$$

The $p_f$ vector is processed as described above with the IS-95 system. The magnitude and angle of arrival (AOA) estimates each symbol time produced from PSC unit 630 are sent to a DSP unit 640 in the MS. DSP unit 640 generates the AOA histogram and determines the mean AOA value and angle spread estimate, similar to the processing described above.

Once the AOA histogram has been generated and the mean AOA value and angle spread estimate have been determined, this information is used by DSP unit 640 to generate the subspace matrix $\hat{V}$ for EMP 650, as described above. This information is also used by DSP unit 640 to determine the beamforming coefficients, $x_i$ (i=1 to J), for the J transmit beams. These beamforming coefficients $x_i$ will typically be selected as columns from the array manifold within the region of angle spread around the mean AOA value. These coefficients are sent to the BS to be used for transmit beamforming and are used by the MS in the beamformer blocks shown in FIG. 6. Note that in FIG. 6, the output signals from the EMP to the beamformer blocks are not the beamformer coefficients as described for the reverse link case. Instead, the EMP output signals are now the input signals to the beamformer blocks. The EMP output signals simply represent a filtered version of $y_{fp}$, which is now a better estimate of the forward link spatial signature. The filtered version of $y_{fp}$ is obtained from the output signals of the EMP, which is given by equation (4) (i.e., equation (4) where w represents the filtered version of $y_{fp}$).

Alternatively, the DSP unit can be divided between the MS and the BS. The MS generates the AOA histogram and associated mean AOA value and angle spread estimate and sends these values to the BS for further processing. The BS uses this information to generate the subspace for the EMP as described above. This information is also used to determine the beamforming coefficients, $x_i$ (i=1 to J), for the J transmit beams. These beams will typically be selected as columns from the array manifold within the region of angle spread around the mean AOA value. These coefficients are used by the BS for transmit beamforming and are sent to the MS to be used in the beamformer blocks shown in FIG. 6.

In the case where "fast feedback" (e.g., 1 to 10 kbps rate) from the MS to the BS is feasible, actual spatial signature estimates (i.e., filtered versions of $y_{fp}$) can be used for beamforming coefficients in the BS instead of the coefficients from the array manifold as described in the previous section. This is also possible when the forward link spatial signature is changing at a slower rate than would be typical for mobile applications (e.g., wireless local loop applications) such that the feedback rate becomes "slow" (<1 kbps).

In this case, the filtered version of $y_{fp}$ at the output terminal of the EMP is sent back to the BS to be used as the coefficients for the transmit beamformer. In FIG. 6, for J=1, there is one beamformer block, and the coefficients of this one block are the same as the coefficients sent to the BS. The coefficients used in the BS and MS are synchronized so that they are changed at the same time.

The next step in coherent demodulation of the data signal from each of the J beams is applying the beamformer coefficient vector $x_i$ for beam i (i=1 to J) to the spatial signature estimate of $y_{fp}$ from the EMP. This is just the inner product, $c_i = x_i^T y_{fp}$, between the two vectors. In this case, however, the transpose of the coefficient vector is used, not the hermitian transpose as previously described. The resulting complex scalar output signal, $c_i$, is multiplied (after first conjugating) by the de-spread data streams, $d_i$, from de-spreading unit 610 to produce data estimates, $c_i^* d_i$, to be further processed in the standard CDMA2000 forward link decoder.

Although the invention has been described with reference to particular embodiments, the description is only an example of the invention's application and should not be taken as a limitation. Various adaptations and combinations of features of the embodiments disclosed are within the scope of the invention as defined by the following claims.

We claim:

1. A method of signal processing for a wireless communication system, comprising:
    receiving a set of de-spread vectors $y_i$, wherein i=1 to N and N is the number of possible received symbols from a wireless transmission;
    spatially correlating each of the de-spread vectors $y_i$ with an array manifold matrix C to produce a correlation matrix P, wherein each vector $y_i$ has M components, M being equal to the number of antenna output elements;
    determining angle of arrival (AOA) information of each vector $y_i$ from matrix P;
    determining angular distribution information from a collection of AOA information;
    creating a subspace matrix from the matrix C and the AOA and angular distribution information;
    projecting each vector $y_i$ into the subspace matrix to produce a set of N vectors $z_i$;
    finding a vector $z_{max}$ from the one of vectors $z_i$ having the maximum energy;
    averaging vector $z_{max}$ to get a vector $z_{avg}$; and
    multiplying vector $z_{avg}$ with the subspace matrix to produce a beamforming coefficient vector w.

2. The method of claim 1, wherein the determining comprises finding the maximum element of the matrix P.

3. The method of claim 1, wherein the determining comprises finding the maximum element of the matrix resulting from averaging a set of P matrices.

4. The method of claim 1, further comprising, after the multiplying, determining the inner product of each vector $y_i$ with the vector w.

5. The method of claim 1, wherein the array manifold matrix C is an M×K matrix, K being equal to the number of angles in the array manifold.

6. The method of claim 5, wherein the elements of the $i^{th}$ column of the correlation matrix P represent a level of correlation between vector $y_i$ and the array manifold for each of the K angles.

7. The method of claim 1, wherein creating the subspace matrix comprises a singular value decomposition of a portion of the array manifold matrix C.

8. The method of claim 1, wherein the subspace matrix is an approximation of the actual subspace.

9. The method of claim 8, wherein the approximation is obtained by selecting columns of the actual subspace containing dominant singular values.

10. The method of claim 1, wherein the averaging is over a period approximately an order of magnitude shorter than the Doppler spread of the received signals.

11. The method of claim 1, wherein the system is an IS-95 based system.

12. The method of claim 11, wherein N is equal to 64.

13. The method of claim 11, wherein the determining comprises selecting the row and column of the matrix P containing the overall maximum value of the matrix p.

14. The method of claim 11, wherein the determining comprises:

selecting the maximum-valued element from each row of the matrix P to form a K-element $\tilde{p}$ vector;

averaging the $\tilde{p}$ vector; and selecting the maximum value of the averaged $\tilde{p}$ vector and corresponding position.

15. The method of claim 1, wherein the system is a W-CDMA or CDMA2000 proposed system.

16. The method of claim 15, wherein the $y_i$ vectors are a combination of de-spread pilot vectors $y_p$ and de-spread data vectors $y_d$.

17. The method of claim 15, wherein N is equal to 2.

18. The method of claim 16, wherein the combination comprises a real part and an imaginary part.

19. The method of claim 16, wherein the determining comprises finding the maximum element of the matrix P.

20. The method of claim 16, wherein the determining comprises finding the maximum element of the matrix resulting from averaging a set of P matrices.

21. The method of claim 16, wherein the determining comprises averaging over all the elements of the matrix P and finding the resulting maximum element and corresponding position.

22. A method of signal processing for a wireless communication system, comprising:

receiving, in a mobile station, a de-spread pilot signal vector $y_{fp}$, wherein the vector $y_{fp}$ has M components, M being equal to the number of antenna output elements in the base station;

spatially correlating the vector $y_{fp}$ with an array manifold matrix C to produce a correlation vector $p_f$;

determining angle of arrival (AOA) information for the vector $y_{fp}$ from vector $p_f$;

determining angular distribution information from a collection of AOA information;

creating a subspace matrix from the matrix C and the AOA and angular distribution information;

projecting the vector $y_{fp}$ into the subspace matrix to produce a filtered version of the vector $y_{fp}$;

calculating beamforming coefficients $x_i$, i=1 to J, from the matrix C and the AOA and angular distribution information; and determining the inner product, $x_i^T y_{fp}$, of the vector $y_{fp}$ with each beamforming coefficient vector $x_i$.

23. The method of claim 22, further comprising, after determining the inner product, multiplying the conjugate of each inner product result with an associated one of J de-spread data signal values.

24. The method of claim 22, wherein pilot signals sent from each antenna element in the base station are each spread with a different extended Walsh code.

25. A beamforming system for wireless communication, comprising:

a primary spatial correlator (PSC), wherein the PSC receives de-spread data vectors $y_i$ (i=1 to N) and signals representing an array manifold matrix C and transmits signals representing spatial information of the vectors $y_i$; each vector $y_i$ having M components, M being equal to the number of antenna output elements and N being equal to the number of possible symbols from a wireless transmission;

a digital signal processor (DSP) coupled to the PSC, wherein the DSP determines additional spatial information and determines a subspace containing most of the energy from the vectors $y_i$; and an extended manifold processor (EMP) coupled to the DSP and the vectors $y_i$, wherein the EMP projects signals representing each vector $y_i$ into the subspace to generate projection coefficient vectors $z_i$ and outputs signals representing a beamforming coefficient vector w.

26. The system of claim 25, wherein the spatial information is angle of arrival (AOA) information.

27. The system of claim 25, wherein the additional spatial information is the angular distribution information resulting from a collection of AOA information.

28. The system of claim 25, wherein the PSC performs a spatial correlation between each of the vectors $y_i$ and the matrix C to produce signals representing a correlation matrix P.

29. The system of claim 25, wherein the subspace matrix results from a singular value decomposition of a portion of the array manifold matrix C.

30. The system of claim 25, wherein the subspace matrix is an approximation of the actual subspace.

31. The system of claim 30, wherein the approximation consists of columns of the actual subspace which contain dominant singular values.

32. The system of claim 25, wherein the EMP comprises selection circuitry for selecting a vector $z_{max}$ having the maximum energy of the projection coefficient vectors $z_i$.

33. The system of claim 32, wherein the EMP further comprises averaging circuitry for averaging vectors $z_{max}$ to generate an average projection coefficient vector $z_{avg}$ that when multiplied by the subspace matrix produces an estimate of the spatial signature.

34. The system of claim 33, wherein the EMP further comprises a multiplier for multiplying the vector $z_{avg}$ with the subspace matrix to produce the vector w.

35. The system of claim 25, further comprising a beamformer coupled to the EMP and the signal vectors $y_i$, wherein the beamformer determines the inner product, $w^H y_i$, of each vector $y_i$ with the vector w.

36. The system of claim 25, wherein the system is an IS-95 system.

37. The system of claim 36, wherein N is equal to 64.

38. The system of claim 28, wherein the system is an IS-95 system.

39. The system of claim 38, wherein the PSC selects the row and column of the matrix P containing the overall maximum value of the matrix P.

40. The system of claim 38, wherein the PSC comprises:
first selection circuitry for selecting the maximum-valued element from each row of the matrix P to form a K-element $\tilde{p}$ vector;
averaging circuitry for averaging the $\tilde{p}$ vector; and
second selection circuitry for selecting the maximum value of the averaged $\tilde{p}$ vector and corresponding position.

41. The system of claim 28, wherein the system is a W-CDMA or CDMA2000 proposed system.

42. The system of claim 41, further comprising M data estimators, each data estimator receiving a de-spread pilot vector $y_p$ and de-spread data vector $y_d$ to form combinations of $y_p$ and $y_d$ to use as vectors $y_i$.

43. The system of claim 42, wherein:
the PSC further comprises a receiver for receiving a set of vectors $y_i$ from the data estimators and a transmitter for transmitting spatial information of the vectors $y_i$; and
the DSP is adapted to determine a subspace containing most of the energy from the vectors $y_i$.

44. The system of claim 41, wherein N is equal to 2.

45. The system of claim 41, further comprising a beamformer coupled to the EMP and the de-spread data vectors $y_d$, wherein the beamformer determines the inner product, $w^H y_d$, of each vector $y_d$ with the vector w.

46. A demodulation system for wireless communication comprising a plurality of manifold assisted demodulator (MAD) fingers, a first one of the plurality of MAD fingers comprising:
a first block for de-spreading pilot and data signals and generating a de-spread pilot vector $y_p$ and a de-spread data vector $y_d$;
a first data estimator block that forms complex valued combination vectors, $y_i$, of the de-spread pilot and data signal vectors;
a first primary spatial correlator (PSC), wherein the PSC receives the de-spread data vectors $y_i$ (i=1 to N) and an array manifold matrix C and transmits spatial information of the vectors $y_i$, each vector $y_i$ having M components, M being equal to the number of antenna output elements and N being equal to the number of possible symbols from a wireless transmission;
a first extended manifold processor (EMP), wherein the first EMP receives the vectors $y_i$ and projects each vector $y_i$ into a subspace to generate projection coefficient vectors $z_i$ and outputs a beamforming coefficient vector w; and
a first beamformer coupled to the first EMP and the data signal vectors $y_d$, wherein the first beamformer determines the inner product, $w^H y_d$, of each vector $y_d$ with the vector w.

47. The system of claim 46, wherein a second one of the plurality of MAD fingers consists of:
a second block for de-spreading the pilot and data signals and generating de-spread pilot vector $y_p$ and de-spread data vector $y_d$;
a second data estimator block that forms the complex valued combination vectors, $y_i$, of the de-spread pilot and data signal vectors; and
a second primary spatial correlator (PSC), wherein the second PSC receives the de-spread data vectors $y_i$ (i=1 to N) and the array manifold matrix C and transmits spatial information of the vectors $y_i$, each vector $y_i$ having M components, M being equal to the number of antenna output elements and N being equal to the number of possible symbols from a wireless transmission.

48. The system of claim 47, wherein a third one of the plurality of MAD fingers consists of:
a third block for de-spreading the pilot and data signals and generating de-spread pilot vector $y_p$ and de-spread data vector $y_d$;
a third data estimator block that forms the complex valued combination vectors, $y_i$, of the de-spread pilot and data signal vectors; and
a second extended manifold processor (EMP), wherein the second EMP receives the vectors $y_i$ and projects each vector $y_i$ into a subspace to generate projection coefficient vectors $z_i$ and outputs a beamforming coefficient vector w; and
a second beamformer coupled to the second EMP and the data signal vectors $y_d$, wherein the first beamformer determines the inner product, $w^H y_d$, of each vector $y_d$ with the vector w.

* * * * *